United States Patent
Tang et al.

(10) Patent No.: US 8,737,939 B1
(45) Date of Patent: May 27, 2014

(54) METHOD AND APPARATUS FOR DETECTING PRESENCE OF AN UNMODULATED RF CARRIER PRIOR TO A COMMUNICATION FRAME

(75) Inventors: Kevin Hsiao-Cheng Tang, Milpitas, CA (US); Atul Salhotra, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 31 days.

(21) Appl. No.: 13/250,701

(22) Filed: Sep. 30, 2011

Related U.S. Application Data

(63) Continuation of application No. 11/213,907, filed on Aug. 30, 2005, now Pat. No. 8,032,095.

(60) Provisional application No. 60/658,334, filed on Mar. 3, 2005.

(51) Int. Cl.
*H04B 1/04* (2006.01)

(52) U.S. Cl.
USPC ........ 455/127.1; 455/63.1; 375/147; 332/162

(58) Field of Classification Search
USPC ............ 455/63.1, 67.11, 67.13, 127.1, 127.5; 375/147; 332/123, 162
See application file for complete search history.

(56) References Cited

U.S. PATENT DOCUMENTS

| | | | |
|---|---|---|---|
| 4,663,758 A * | 5/1987 | Lambarelli et al. ........... | 370/431 |
| 4,862,098 A | 8/1989 | Yassa et al. | |
| 5,073,822 A | 12/1991 | Gumm et al. | |
| 5,162,723 A | 11/1992 | Marzalek et al. | |
| 5,294,937 A | 3/1994 | Ostteen et al. | |
| 5,396,196 A | 3/1995 | Blodgett | |
| 5,481,218 A | 1/1996 | Nordholt et al. | |
| 5,493,210 A | 2/1996 | Orndorff et al. | |
| 5,608,428 A | 3/1997 | Bush | |
| 5,633,582 A | 5/1997 | Orndorff et al. | |
| 5,852,381 A | 12/1998 | Wilmot et al. | |
| 5,920,506 A | 7/1999 | Wang et al. | |
| 5,982,165 A | 11/1999 | Bowyer et al. | |
| 6,005,518 A | 12/1999 | Kallina | |
| 6,018,358 A | 1/2000 | Bush | |
| 6,091,941 A * | 7/2000 | Moriyama et al. ............ | 455/126 |
| 6,108,593 A * | 8/2000 | Didinsky et al. ................ | 701/13 |
| 6,144,649 A | 11/2000 | Storm et al. | |

(Continued)

OTHER PUBLICATIONS

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

(Continued)

*Primary Examiner* — Nhan Le

(57) ABSTRACT

A measurement signal, the measurement signal indicative of a bias in a signal received via a communication channel, is generated. A detection signal, the detection signal indicative of presence of an unmodulated radio frequency (RF) carrier prior to a communication frame in the signal received via the communication channel, is generated using the measurement signal.

25 Claims, 15 Drawing Sheets

(56) References Cited

U.S. PATENT DOCUMENTS

| | | |
|---|---|---|
| 6,281,507 B1 | 8/2001 | Ghelmansarai |
| 6,313,874 B1 | 11/2001 | Bowyer et al. |
| 6,353,636 B1 | 3/2002 | Tate et al. |
| 6,959,053 B2 | 10/2005 | Gerhards et al. |
| 6,968,170 B2 | 11/2005 | Talbot |
| 7,068,983 B2 | 6/2006 | Kanazawa et al. |
| 7,085,246 B1 | 8/2006 | LaRosa et al. |
| 7,133,644 B2 | 11/2006 | Demir et al. |
| 7,206,557 B2 | 4/2007 | Aytur et al. |
| 7,376,200 B2 | 5/2008 | Demir et al. |
| 7,395,548 B2 | 7/2008 | Runzo |
| 7,420,503 B2 | 9/2008 | Uchino |
| 2002/0186791 A1 | 12/2002 | Foxcroft et al. |
| 2003/0012312 A1 | 1/2003 | Gerhards et al. |
| 2003/0022645 A1 | 1/2003 | Runzo |
| 2003/0143951 A1 | 7/2003 | Challa et al. |
| 2004/0121741 A1 | 6/2004 | Rashev et al. |
| 2004/0132424 A1 | 7/2004 | Aytur et al. |
| 2004/0161064 A1 | 8/2004 | Brethour et al. |
| 2004/0248516 A1 | 12/2004 | Demir et al. |
| 2004/0252782 A1 | 12/2004 | Demir et al. |
| 2004/0264594 A1 | 12/2004 | Kasai et al. |
| 2005/0034170 A1 | 2/2005 | Bush et al. |
| 2005/0069050 A1 | 3/2005 | Ding et al. |
| 2005/0285781 A1* | 12/2005 | Park et al. ............... 342/357.02 |
| 2006/0062324 A1 | 3/2006 | Naito et al. |
| 2006/0133456 A1 | 6/2006 | Ettorre et al. |
| 2006/0154628 A1 | 7/2006 | Mochizuki |
| 2006/0182197 A1 | 8/2006 | Godambe et al. |
| 2006/0208820 A1 | 9/2006 | Parsa et al. |
| 2006/0291589 A1 | 12/2006 | Eliezer et al. |
| 2007/0049219 A1 | 3/2007 | Demir et al. |
| 2007/0057718 A1 | 3/2007 | Coulson |
| 2007/0119238 A1 | 5/2007 | Issel |
| 2008/0063113 A1 | 3/2008 | Gao et al. |

OTHER PUBLICATIONS

S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005.

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the GHZ Band," *The Institute of Electrical and Electronics Engineers, Inc.*, (1999).

IEEE Std 802.16/2004 (Revision of IEEE Std 802.16-2001), "IEEE Standard for Local and metropolitan area networks; Part 16: Air Interface for Fixed Broadband Wireless Access Systems," *The Institue of Electrical and Electronics Engineers, Inc.*, Oct. 1, 2004.

IEEE 802.20-PD-06; IEEE P 802.20™ V14, Draft 802.20 Permanet Document; <System Requirements for IEEE 802.20 Mobile Broadband Wireless Access System—Version 14>, Jul. 16, 2004; 24 pages.

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, 1999.

* cited by examiner

METHOD AND APPARATUS FOR DETECTING PRESENCE OF AN UNMODULATED RF CARRIER PRIOR TO A COMMUNICATION FRAME

CROSS-REFERENCE TO RELATED APPLICATIONS

This present application is a continuation application of U.S. application Ser. No. 11/213,907, now U.S. Pat. No. 8,032,095, entitled "METHOD AND APPARATUS FOR DETECTING CARRIER LEAKAGE IN A WIRELESS OR SIMILAR SYSTEM," filed on Aug. 30, 2005, the disclosure of which is expressly incorporated by reference herein in its entirety, which claims the benefit of U.S. Provisional Application No. 60/658,334, filed on Mar. 3, 2005, the disclosure of which is expressly incorporated by reference herein in its entirety.

BACKGROUND

1. Field of the Disclosure

The disclosure is directed generally to a method and apparatus that detects wireless transmission problems and, more particularly, to detecting an unmodulated radio frequency (RF) carrier prior to a communication frame in a signal received via a communication channel. Moreover, the disclosure is directed to a method and device to receive and/or recover a transmission frame in the presence of an unmodulated radio frequency (RF) carrier prior to the communication frame.

2. Related Art

In order to transmit data in a transmission frame in a wireless system from a transmitter to a receiver, including a wireless network, the transmitter must first turn on or power up a power amplifier and/or other related components. Normally the power up process takes about two to three micro-seconds for a power amplifier, and its associated circuitry, to fully power up in order to transmit a transmission frame. During the period of time that the power amplifier is powering up, no transmission of a transmission frame with data takes place. This is done in order to minimize any signal distortion caused by powering up the amplifier. However, the wireless system transmitter may transmit during the power up time period an unmodulated radio frequency carrier prior to the transmission of the transmission frame. The power of this unmodulated radio frequency carrier or carrier leakage in the transmission frame is typically about 20 to 30 dB below the actual signal power of the remaining part of the transmission frame. Moreover, the carrier leakage may have an almost near DC characteristic in that the signal is mostly ones or zeros.

FIG. 1 shows an exemplary transmission frame 100 having carrier leakage 110 in the front portion of the transmission frame 100. In particular, the desired portion of the transmission frame 100 that is to be received in a receiver is the preamble 120, header/signal field 140, and data 160 (payload). It is not desired for a receiver to receive any carrier leakage 110. In this regard, the undesired reception of the carrier leakage 110 is generally minimal when there is a large distance between the transmitter and the receiver. Accordingly, desired signal strength can be still be above the receiver sensitivity level whereas the carrier leakage 110 is then buried in thermal noise and the carrier leakage 110 has little or no effect. Moreover, the reduced power of the carrier leakage 110 (specified at about 20-30 dB below the actual signal power) allows the receiver to be able to avoid receiving this undesired signal in the background.

Carrier leakage is more problematic when the transmitter and receiver are relatively close, such as in current Wireless Local Area Networks (WLAN) systems, for example those compliant with IEEE 802.11, 802.11(a), 802.11(b), 802.11 (g), 802.11(n), 802.16, and 802.20, which are being used with increasing frequency in relatively close quarters in homes, businesses, and commercial applications. When the transmitter and the receiver are relatively close, the receiver has a tendency to falsely start receiver processing in response to the carrier leakage 110. In particular, the nearer the receiver to the transmitter and the shorter duration of the energy at an antenna can potentially or falsely start receiver processing, gain control, signal detection, and/or synchronization mechanisms and the like. For example, in some WLAN systems, such as IEEE 802.11(a), the initial symbol timing synchronization relies on certain periodicity of a short preamble. Since the unmodulated radio frequency carrier, including the carrier leakage 110, is near DC at a base band, this fulfills the periodicity requirement and subsequently causes the receiver to faultily trigger and start detection of the transmission frame 100 together with the carrier leakage 110. Since the carrier leakage 110 is much lower in power compared to the actual transmission frame 100 parts including the preamble 120 of the signal, the header/signal field 140, and data 160, when the gain control locks on to the carrier leakage 110, the remaining part of the transmission frame 100 including parts 120, 140, 160 may be saturated in the transmitter and lost once received in receiver. This would subsequently cause a significant degradation in the throughput performance that has been both observed in real operation and environments in the lab, as well as in simulations.

SUMMARY OF THE DISCLOSURE

In an embodiment, an apparatus comprises a measurement circuit configured to generate a measurement signal indicative of a bias in a signal received via a communication channel, and a circuit configured to generate, using the measurement signal, a detection signal that indicates presence of an unmodulated radio frequency (RF) carrier prior to a communication frame in the signal received via the communication channel.

In another embodiment, a method includes generating a measurement signal indicative of a bias in a signal received via a communication channel, and generating, using the measurement signal, a detection signal that indicates presence of an unmodulated radio frequency (RF) carrier prior to a communication frame in the signal received via the communication channel.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced. In the drawings.

DETAILED DESCRIPTION

Figure 1:
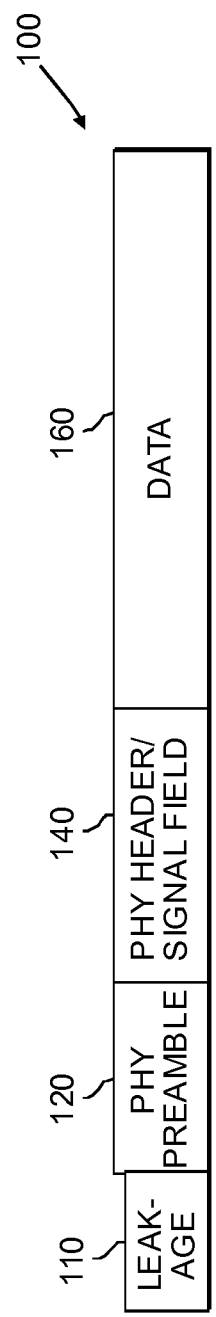
FIG. 1 shows a typical transmission frame with a transmission having carrier leakage.

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings.

Figure 2:
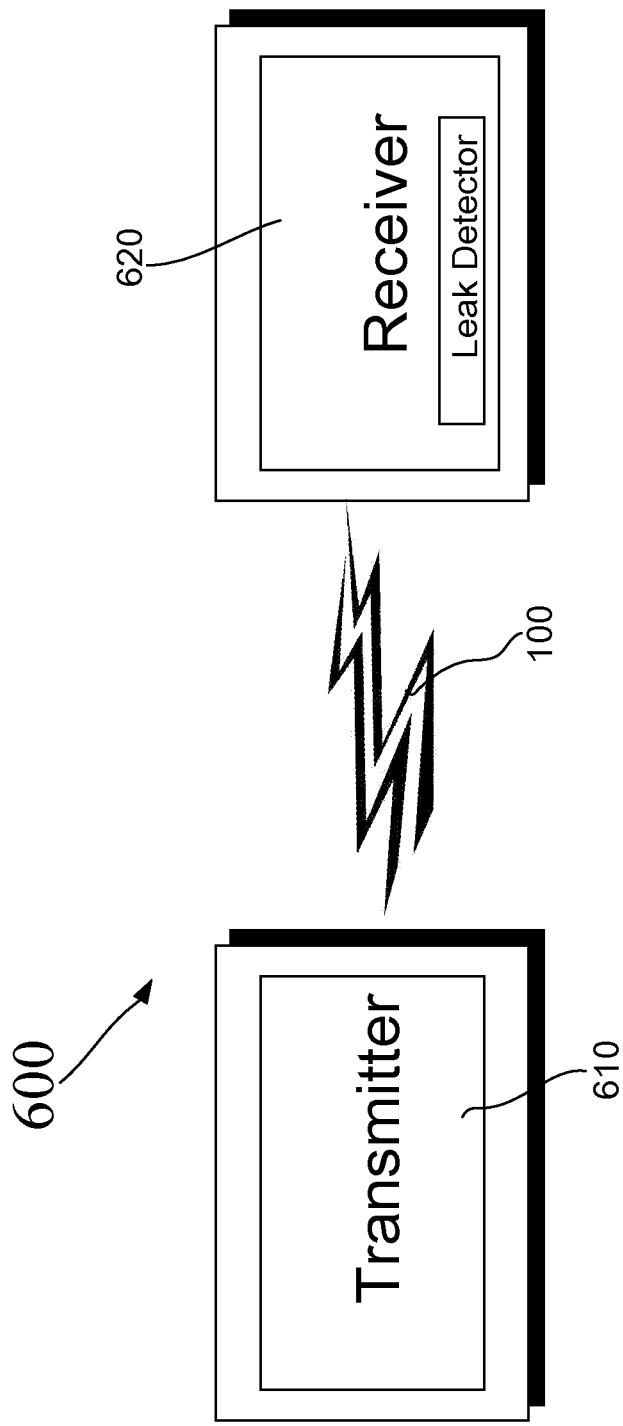
FIG. 2 shows a single input single output (SISO) receiver and transmitter system that may use the carrier leakage detection circuits of the invention.

FIG. 2 schematically shows how the invention may be implemented in a wireless single input single output (SISO) receiver and transmitter system 600. In particular, the wireless system 600 includes a transmitter 610 that transmits a transmission frame 100 to a receiver 620. Of course, it should be apparent that the transmitter 610 can also include a receiver (transceiver) and the receiver 620 can include a transmitter (transceiver). The receiver 620 shown in FIG. 2 further includes a carrier leak detector circuit of the invention. Accordingly, the receiver 620 is able to detect carrier leakage 110, control reception based thereon, and operate with greater throughput.

Figure 3:
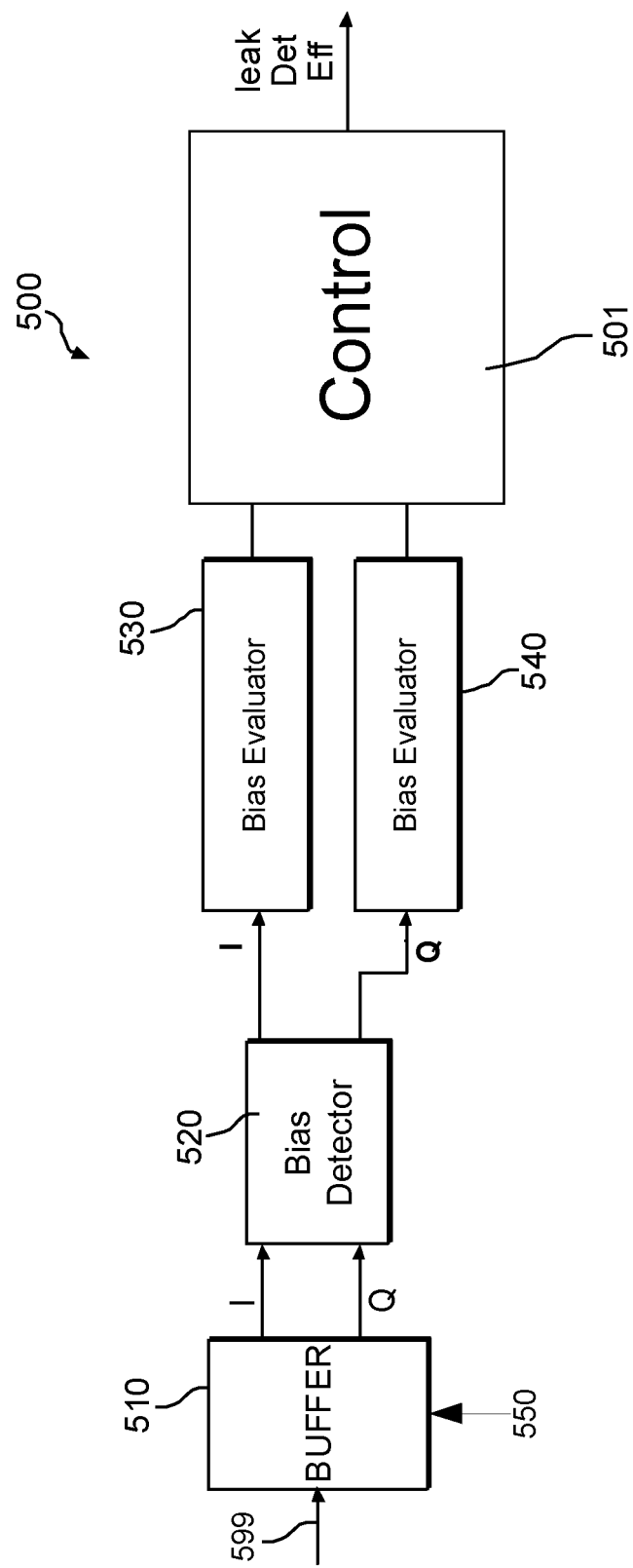
FIG. 3 shows a circuit for detecting carrier leakage in a SISO transceiver constructed according to the principles of the invention.

FIG. 3 shows a circuit for detecting carrier leakage in a SISO transceiver such as a SISO system 600. In particular, the received transmission frame 100 is received initially in a receiver and a characteristic of the signal, such as the logical states thereof, is stored in the buffer 510. The logical states contemplated for use in the invention may be any logical states known in the art, including polarity, logical ones and zeros, and similar states. For ease of explanation, the detailed description will reference ones and zeros as the exemplary logical states, but any such known logical state may be employed in the invention. As described herein, in order to determine whether the characteristic of the signal stored in the buffer has a particular bias in favor of a logical state, the circuits of the invention either count the number of a particular logical state, such ones or zeros, in the stored signal, the number of the transitions between logical state in the stored signal, or the time period in which a particular logical state is resident in the signal. Once the logical state is counted or timed in a bias detector of the invention, a bias evaluator determines whether the signal has a particular bias in favor of one of the logical states by comparing the values to one or more predetermined thresholds. The invention uses this bias information to detect a carrier leakage, which carrier leakage 110 does not typically have an equal number of logical states. On the contrary, carrier leakage typically has a predominant number of one state. Accordingly, detecting a bias for a window or portion of a signal allows detection of the carrier leakage.

The buffer 510 holds the characteristics of the received signal within a window of time. The size of window may be controlled based on a window size input 550. The window size input 550 may be set by various features such as the transmission protocol type or may be adaptive to the various other transmission factors in order to increase throughput. The values stored in the buffer 510 are output as an in-phase and quadrature-phase signal that is input to a bias detector 520 that detects a bias in the signal output from the buffer 510 from the in-phase and quadrature-phase outputs. The bias detector may employ a counter, such as described in the FIG. 4 embodiment, to determine the quantity of a signal polarity, or logical states, such as ones or zeros, present in a signal with the amount of any of these signal components indicating a bias. Alternatively, a timer may be employed to measure in a time window the length of time a signal polarity, or logical state, such as ones or zeros, are resident (present) in a signal. In another embodiment, the bias may be detected based on the number of transitions from one state to another state. Detecting the number of transitions from one state to another allows the detection of a bias. The amount of bias is then output by bias detector 520 to bias evaluators 530 and 540, which may be comparator circuits, such as described in the FIG. 4 embodiment.

The output of the bias evaluator circuits 530 and 540 determine whether or not the bias has met a minimum threshold or failed to meet a maximum threshold (i.e., has allowable transmission signal values). In particular, if the bias exceeds a maximum threshold or is less than minimum threshold, a signal indicating carrier leakage is set and output from the bias evaluator 530 and/or 540. The outputs of the bias evaluators 530 and 540 are input to a control circuit 501 that outputs a leakage detection signal based on at least a logical combination of the output of bias evaluators 530 and 540. The signal subsequently is used at least in part to disable the receiver to avoid a reception error and reduced throughput.

Figure 4:
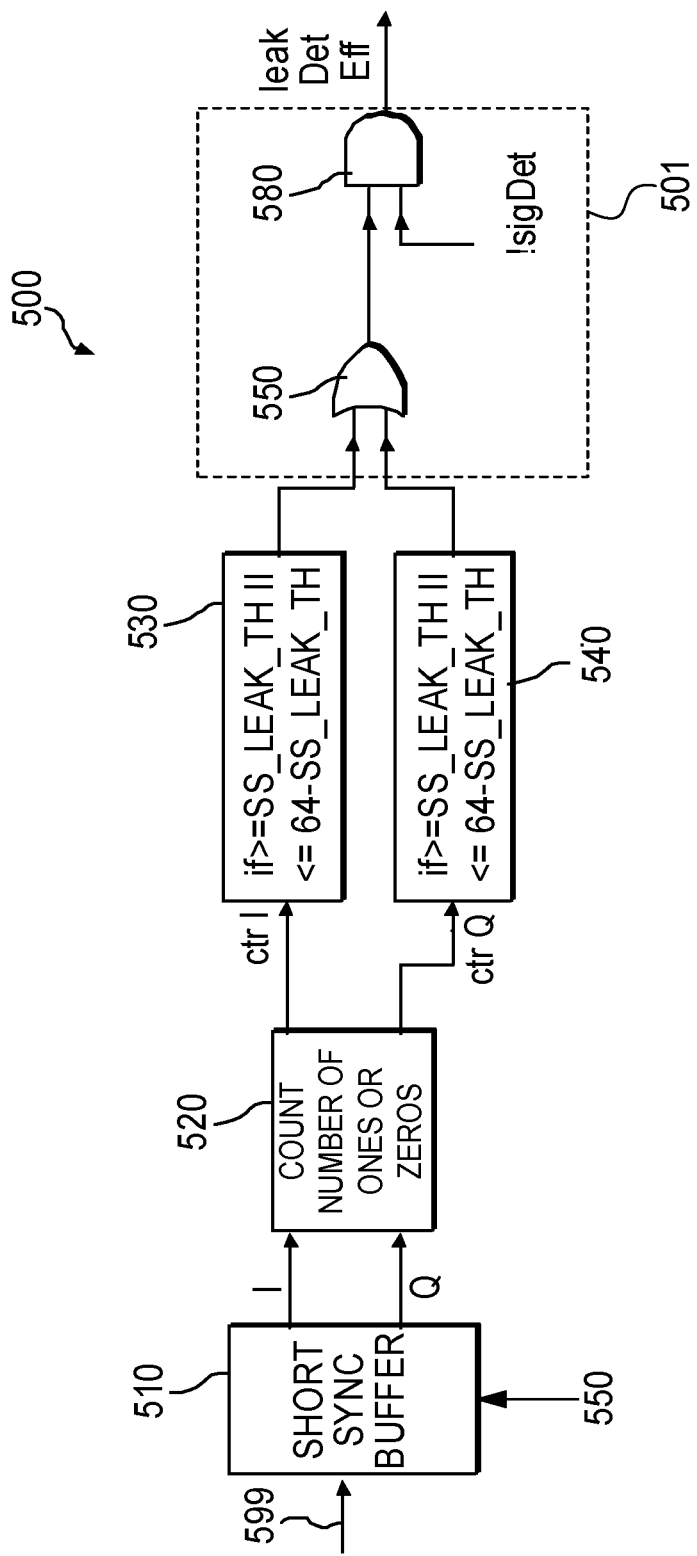
FIG. 4 shows a more detailed embodiment of the circuit for detecting carrier leakage shown in FIG. 3.

FIG. 4 shows a more detailed embodiment of the FIG. 3 circuit for the detection of carrier leakage 110 in a SISO type receiver. In particular, the received transmission frame 100 is received initially in a receiver and the signal characteristics, such as the polarities, are stored in a buffer 510, such as a short sync buffer, as ones (or alternatively zeros) based on input 599. The window time may be responsive to a window time signal 550. The buffer 510 holds the polarities of the received signal within the window of time. The values stored in the buffer 510 are output as an in-phase and quadrature-phase signal that is input to a counter 520 that counts the number of ones that are output from the buffer 510 from the in-phase and quadrature-phase outputs within a given time period. The counter value provides an indication of whether the samples that are currently being received are part of WLAN short preamble or near-DC leakage. If it is a short preamble, the number of ones and zeros would be roughly the same since the signal fluctuates about DC. However, if it is a strong near-DC leakage, buffered sign bits would be mostly ones or mostly zeros depending on the polarity. Once the number of ones has been counted in counter 520, the counter 520 outputs the number of ones to comparator circuits 530 and 540, respectively.

In a specific embodiment shown in FIG. 4, the buffer 510 holds the polarities of the received signal within a 1.6 microsecond window that is associated with a particular sampling rate of 40 MHz. Accordingly there are 64 such stored polarities within the 1.6 microsecond window.

As noted herein, carrier leakage 100 does not typically have an equal number of ones and zeros. On the contrary, a carrier leakage typically has a predominant number of zeros or a predominant number of ones. Accordingly, counting the number of ones for a window or portion of a signal allows detection of the carrier leakage. The comparator circuits 530 and 540 determine whether or not the number of ones and/or the number of zeros has met a minimum threshold or failed to meet a maximum threshold. Thus, the output of comparator circuits 530 and 540 is based on whether or not the number of ones (or the number of zeros) has met a minimum threshold or failed to meet a maximum threshold (i.e., has allowable transmission signal values). In particular, when the number of ones exceeds a maximum threshold (SS_leak_TH) or is less than window size minus the maximum threshold (for example 64 minus the maximum threshold SS_leak_TH (minimum threshold)), a carrier leakage signal is set and output from the comparator circuit 530 and/or comparator circuit 540. The outputs of the comparator circuit 530 and the comparator circuit 540 are input to an OR gate 550 in control circuit 501.

The OR gate 550 outputs the carrier leakage detection signal when the carrier leakage detection signal is received from either the comparator circuit 530 or the comparator circuit 540. Thereafter the OR gate 550 inputs the carrier leakage detection signal to an AND gate 580. The AND gate 580 ANDs the carrier leakage detection signal together with a signal detection signal (!sigDet). The signal detection signal goes high when the receiver has received a valid Clear Channel Assessment (CCA) signal. So when the carrier leakage signal is high and the valid CCA received signal is high, the AND gate 580 outputs a leakage detection signal. The signal subsequently disables the receiver to avoid a transmission error and reduced throughput.

Figure 5:
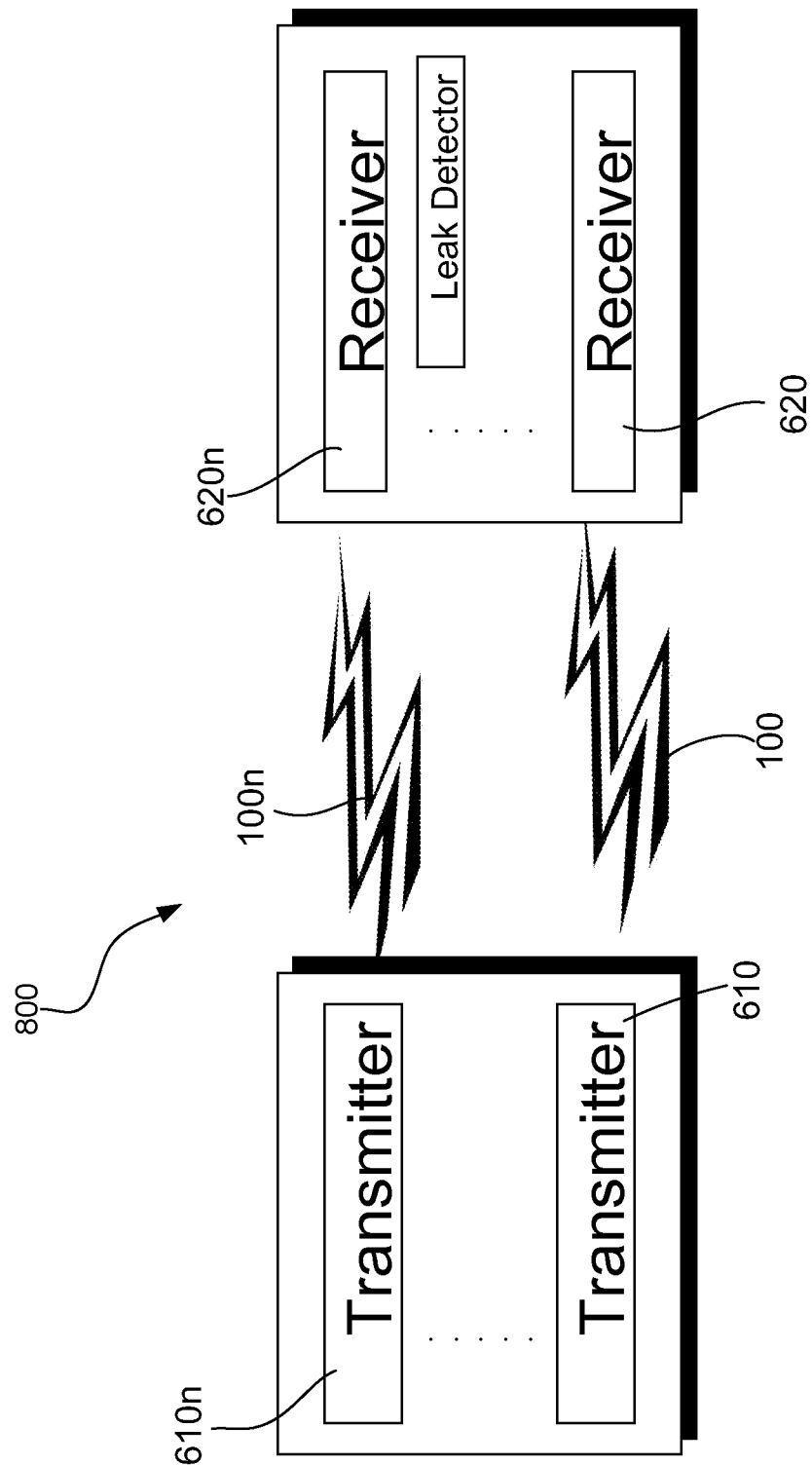
FIG. 5 shows a multiple input multiple output (MIMO) receiver and transmitter system that may use the carrier leakage detection circuits of the invention.

FIG. 5 schematically shows how the invention may be implemented in a wireless Multiple Input Multiple Output (MIMO) receiver and transmitter system 800. In particular, the wireless system 800 includes at least a transmitter 610 that transmits a transmission frame 100 to a receiver 620, and a transmitter 610n that transmits a transmission frame 100n to a receiver 620n. Of course, it should be apparent that the transmitters 610, 610n can also include receivers (transceivers) and the receivers 620, 620n may include also transmitters (transceivers). In addition, there may be more than two transmitters and/or more than two receivers. The receivers 620, 620n shown in FIG. 5 further include a carrier leak detector circuit of the invention. Accordingly, the receivers 620, 620n are able to detect carrier leakage 110, control reception based thereon, and operate with greater throughput.

Figure 6:
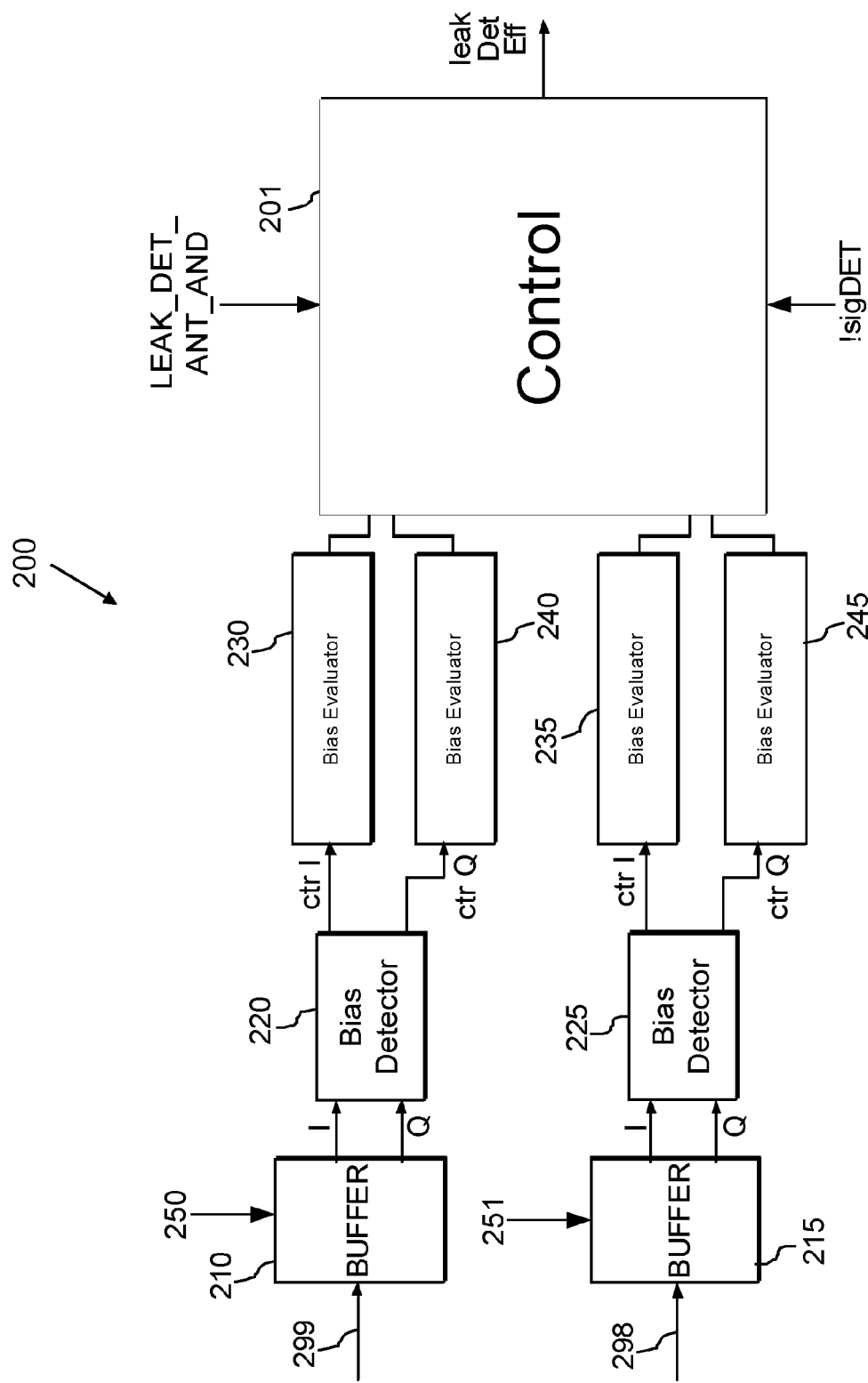
FIG. 6 shows a circuit for detecting carrier leakage in a MIMO transceiver constructed according to the principles of the invention.

FIG. 6 shows a circuit for the detection of carrier leakage 110 in a MIMO transceiver, such as MIMO system 800. The characteristics of an input 299 of the transmission frame 100 are stored in a buffer 210 as logical states in the same manner as described above in connection with the SISO embodiments. The buffer 210 holds the logical states of the received transmission frame 100 within a limited time window that is associated with a particular sampling rate, with the window of time being adjustable responsive to an input 250. The values stored in the buffer 210 are output as an in-phase (I) signal and a quadrature-phase (Q) signal that are input to bias detector 220. The bias detector 220 detects the bias in the in-phase and quadrature-phase inputs within a given time-period in a manner similar to that described in connection with the FIG. 3 bias detector 520. Once the bias is detected, the bias is output to bias evaluators 230 and 240, which may be comparator circuits as described in the FIGS. 7 and 8 embodiments.

The I and Q phases are 90 degrees offset from one another. The 90-degree separation allows for two distinct windows in which the bias is detected. However, it is contemplated that a single-phase system could be used, however it may not be as robust as the I and Q phases but may require less circuit or chip area.

The bias evaluators 230 and 240 determine whether or not a bias has met a minimum threshold or failed to meet a maximum threshold in a manner similar to that described in connection with the FIG. 3 bias evaluators 530, 540. The outputs of bias evaluators 230 and 240 are input to a control 201.

A second parallel system for use in the MIMO transceiver is also shown in FIG. 6. In particular, a buffer 215 holds the characteristics of another received signal within a window based on input 298, with the window size of buffer 215 being adjustable in response to a signal 251. The values stored in the buffer 215 are again output as an in-phase and quadrature-phase signal that are input to a bias detector 225 that detects a bias as noted above. Once the bias has been detected, the bias value is output to the bias evaluators 235 and 245.

The bias evaluators 235 and 245 again determine whether or not the bias has met a minimum threshold or failed to meet a maximum threshold or is within allowable transmission signal values as noted above with bias evaluators 530, 540 of FIG. 3. The outputs of bias evaluators 235 and 245 are also input to the control 201.

Figure 7:
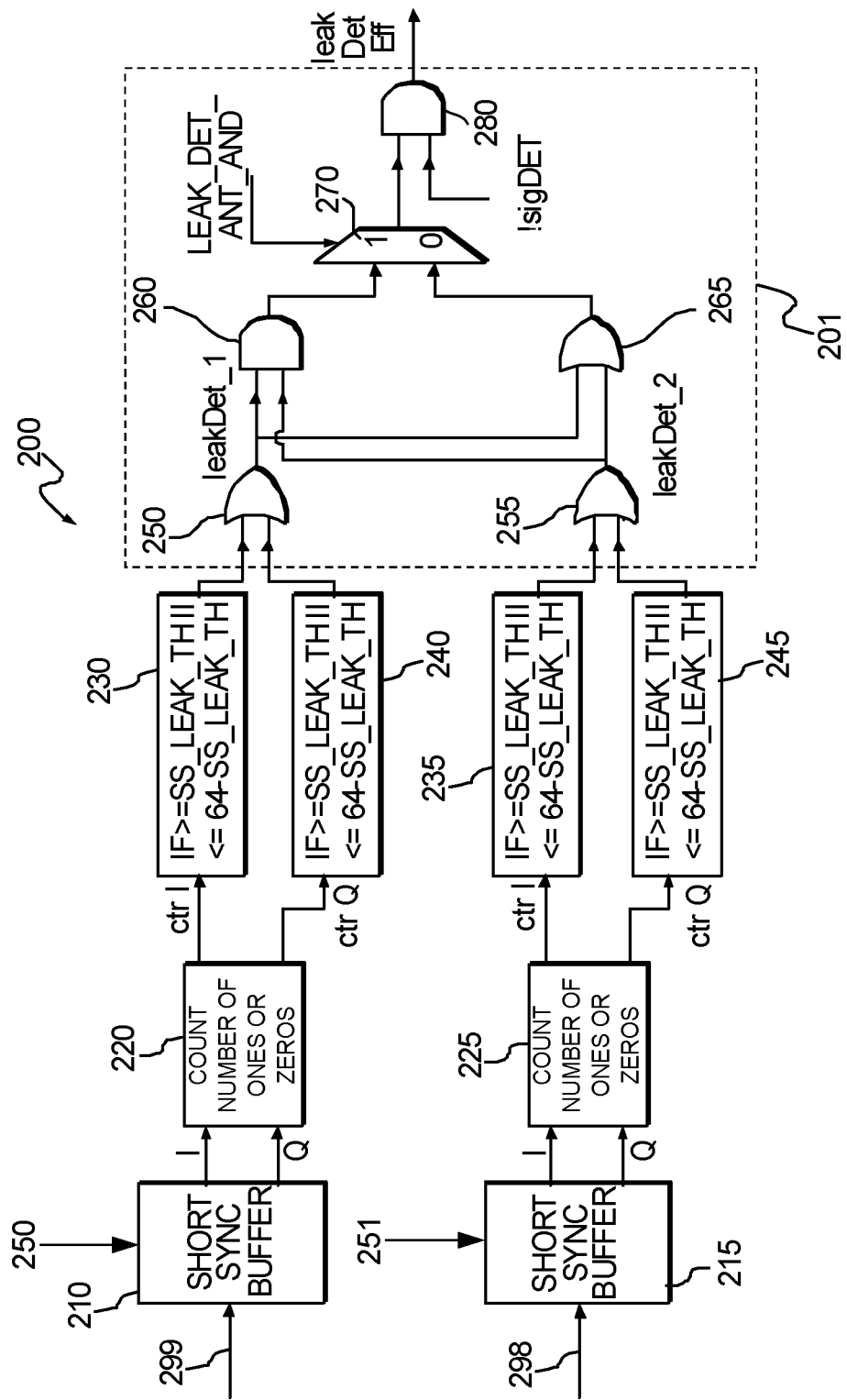
FIG. 7 shows a more detailed embodiment of the circuit for detecting carrier leakage shown in FIG. 6, including a sensitivity selector.

The control 201 thus receives the carrier leakage detection signal from circuits 230, 235, 240, 245 together with a signal detection signal (!sigDet) and optionally a sensitivity level signal (LEAK_DET_ANT_AND), such as shown in FIG. 7 described below. The signal detection signal (!sigDet) goes high when the receiver has received a CCA signal. So when the carrier leakage signal is high and there is a valid CCA signal received such that the carrier leakage signal (!sigDet) is high, the control 201 will combine these signals logically and output a leakage detection signal (leakDetEff) accordingly based on the sensitivity level signal LEAK_DET_ANT_AND (if employed).

FIG. 7 shows a more detailed embodiment of the circuit for detecting carrier leakage shown in FIG. 6, including a sensitivity selector. The logical states such as the polarities of an input 299 of the transmission frame 100 are stored in a buffer 210, such as a short sync buffer, as ones (or alternatively zeros). The buffer 210 holds the polarities of the received transmission frame 100 within a limited time window that is associated with a particular sampling rate. The length of the window being based on input 250. The values stored in the buffer 210 are output as an in-phase (I) signal and a quadrature-phase (Q) signal that are input to a counter 220. The counter 220 counts the number of ones that are input from the buffer 210 from the in-phase and quadrature-phase inputs within a given time-period. Once the number of ones has been counted in counter 220, the counter 220 outputs the number of ones respectively to comparator circuits 230 and 240. Additionally, it is contemplated that multiple counters can be used to count the number of ones that are input from the buffer 210 from the in-phase and quadrature-phase inputs.

The I and Q phases are 90 degrees offset from one another. The 90-degree separation allows for two distinct windows in which to count ones or zeros. However, it is contemplated that a single-phase system could be used, however it may not be as robust as the I and Q phases but may require less circuit or chip area.

In a specific embodiment shown in FIG. 7, the buffer 210 may hold the polarities of the received signal within a 1.6 microsecond window. This is associated with a 40 MHz sampling rate. Accordingly, there are 64 such stored polarities within the 1.6 microsecond window.

In one particular embodiment, if the number of ones exceeds the maximum threshold (SS_leak_TH) or is less than window-size minus the maximum threshold (for example, less than 64 minus the maximum threshold SS_leak_TH (minimum threshold)), a signal indicating carrier leakage is output from comparator circuit 230 or circuit 240. In other words, the basis for comparison is whether the number of ones is within allowable transmission signal values indicative of a data transmission. The outputs of comparator circuit 230 and comparator circuit 240 are input to an OR gate 250 in control circuit 201. The OR gate 250 outputs the carrier leakage detection signal (leakDet_1) when the carrier leakage detection signal is received from either the comparator circuit 230 or the comparator circuit 240. Thereafter the OR gate 250 inputs the carrier leakage detection signal (leakDet_1) to both an AND gate 260 and an OR gate 265.

A second parallel system for use in the MIMO transceiver is also shown in FIG. 7. In particular, a buffer 215, such as a short sync buffer, holds the polarities of another received signal within a window based on input 298. The values stored in the buffer 215 are again output as an in-phase and quadrature-phase signal that are input to a counter 225 that counts the number of ones that are input from the buffer 215 from the in-phase and quadrature-phase inputs within a given time-period window based on input 251. Once the number of ones has been counted in the counter 225, this counter outputs the number of ones respectively to comparator circuits 235 and 245.

The comparator circuits 235 and 245 determine whether or not the number of ones has met a minimum threshold or failed to meet a maximum threshold or are within allowable transmission signal values. In particular, if the number of ones exceeds the maximum threshold (SS_leak_TH) or is less than a window size minus the maximum threshold (for example, 64 minus the maximum threshold SS_leak_TH (minimum threshold)), a signal indicating carrier leakage is set and output from comparator circuit 235 and/or circuit 245. The outputs of comparator circuit 235 and comparator circuit 245 are input to an OR gate 255 in control circuit 201. The OR gate 255 outputs the carrier leakage detection signal (leakDet_2) when the carrier leakage detection signal is received from either the comparator circuit 235 or the comparator circuit 245. Thereafter, the OR gate 255 also outputs the carrier leakage detection signal (leakDet_2) to both the AND gate 260 and the OR gate 265 that form a logical combination of the signals (leakDet_1, leakDet_2).

The output of both the AND gate 260 and the OR gate 265 is input to a multiplexer 270. The choice of whether the carrier leakage detection signal from the AND gate 260 or the carrier leakage detection signal from the OR gate 265 is selected is based on the selection signal (LEAK_DET_ANT_AND) the multiplexer 270 receives to select either the AND gate 260 or the OR gate 265 outputs. The choice of the AND gate 260 or the OR gate 265 input is a matter of sensitivity preference. More specifically, the sensitivity of determining whether the carrier leakage 110 is detected is higher with the OR gate 265 than the AND gate 260. In other words, the AND gate 260 requires at least one leak detection signal from each input 298, 299, whereas the OR gate 265 requires only one.

When the multiplexer 270 receives the carrier leakage detection signal on a channel that has been selected by the selection signal, the multiplexer 270 outputs the carrier leakage detection signal when carrier leakage has been detected by that channel. This output is input to an AND gate 280. The AND gate 280 ANDs the carrier leakage detection signal together with a signal detection signal (!sigDet). The signal detection signal goes high when the receiver has received a valid clear channel assessment (CCA) signal. So when the carrier leakage signal is high and there is a valid CCA signal received such that the carrier leakage signal (!sigDet) is high, the AND gate 280 outputs a leakage detection signal (leakDetEff).

Figure 8:
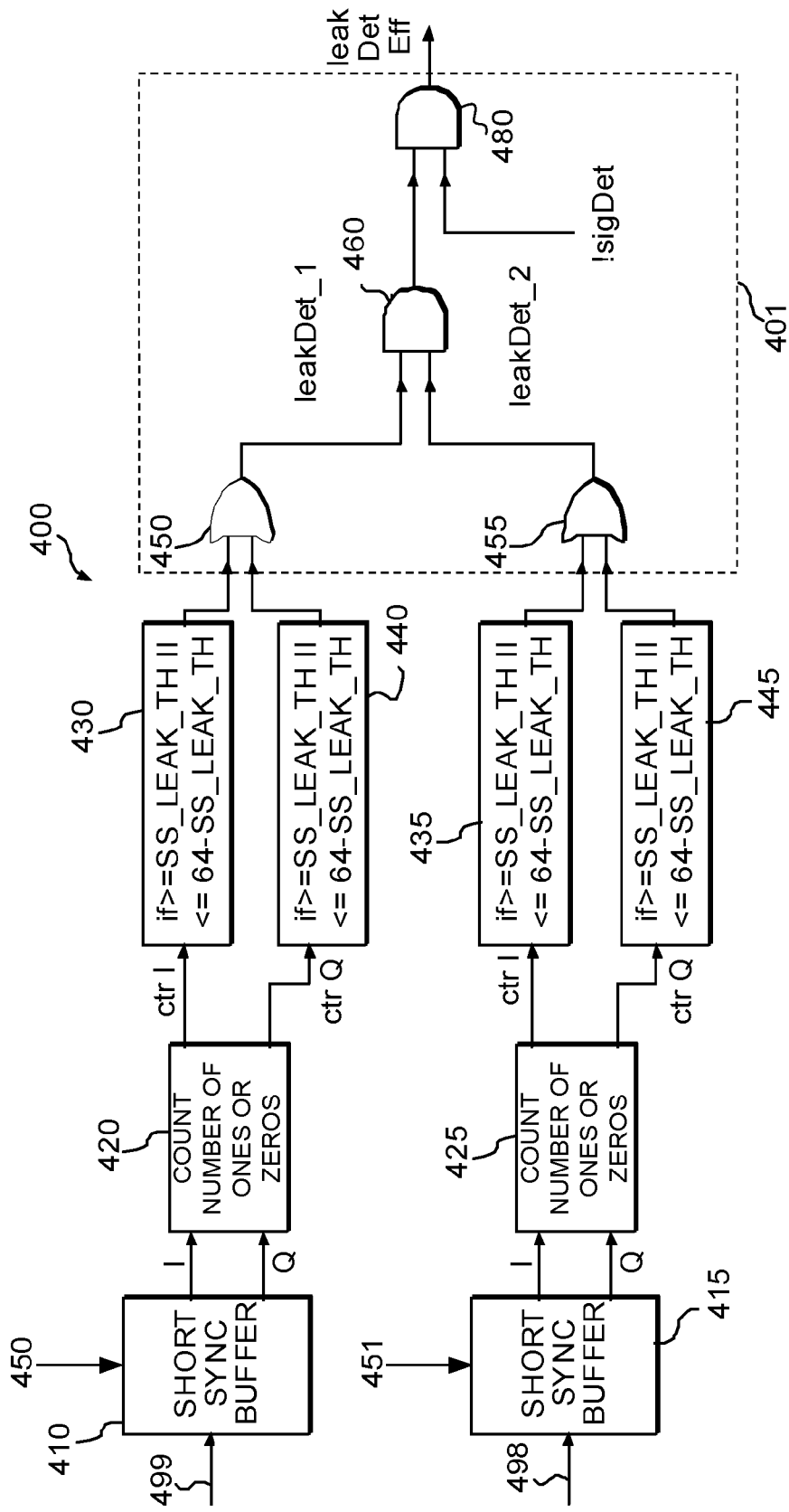
FIG. 8 shows a circuit for detecting carrier leakage similar to FIG. 7, but without a sensitivity selector.

FIG. 8 shows a circuit for the detection of carrier leakage similar to the FIG. 7 circuit, but without a sensitivity selector in the control circuit 401. The logical states, such as polarities of an input 499, are stored in a buffer 410, such as a short sync buffer, as ones (or alternatively zeros). The buffer 410 holds the polarities of the received signal within a limited time window that is associated with a particular sampling rate or based on an input 450. The values stored in the buffer 410 are output as an in-phase and quadrature-phase signal that is input to a counter 420. The counter 420 counts the number of ones or zeros that are input from the buffer 410 from the in-phase and quadrature-phase inputs within a given time-period. Once the number of ones has been counted in counter 420, the counter 420 outputs the number (ctr I, ctr Q) of ones to comparator circuits 430 and 440, respectively.

In a specific embodiment shown in FIG. 8, the buffer 410 may hold the polarities of the received signal within a 1.6 microsecond window. This is associated with a 40 MHz sampling rate. Accordingly there are 64 such stored polarities within the 1.6 microsecond window.

The comparator circuits 430 and 440 determine whether or not the number of ones and the number of zeros has met a minimum threshold or failed to meet a maximum threshold (i.e. is within allowable values of good transmission). In one particular embodiment, if the number of ones exceeds the maximum threshold (SS_leak_TH) or is less than window size minus the maximum threshold (for example, 64 minus the maximum threshold SS_leak_TH (minimum threshold)), a carrier leakage signal is set and output from comparator circuit 430 and/or circuit 440. The outputs of comparator circuit 430 and comparator circuit 440 are input to an OR gate 450 in control 401. The OR gate 450 outputs the carrier leakage detection signal (leakDet_1) when the carrier leakage detection signal is received from either the comparator circuit 430 or the comparator circuit 440. Thereafter the OR gate 450 inputs the carrier leakage detection signal (leakDet_1) to an AND gate 460.

A second parallel system for use in the MIMO transceiver is also shown in FIG. 8. In particular, a buffer 415, such as a short sync buffer, holds the polarities of another received signal 498 within a window of time based on input 451. The values stored in the buffer 415 are again output as an in-phase and quadrature-phase signal that are input to a counter 425 that counts the number of ones that are input from the buffer 415 from the in-phase and quadrature-phase outputs. Once the number of ones has been counted in counter 425, this counter outputs the number ones (ctrOneI, ctrOneQ) respectively to comparator circuits 435 and 445.

The comparator circuits 435 and 445 again determine whether or not the number of ones and the number of zeros has met a threshold or is within allowable transmission values. In one particular embodiment, when the number of ones exceeds the maximum threshold (SS_leak_TH) or is less than a window size minus the maximum threshold (SS_leak_TH (minimum threshold)), a carrier leakage signal is set and output from comparator circuit 435 and/or comparator circuit 445 in control 401. The outputs of comparator circuit 435 and comparator circuit 445 are input to an OR gate 455. The OR gate 455 outputs the carrier leakage detection signal (leakDet_2) when the carrier leakage detection signal is received from either the comparator circuit 435 or the comparator circuit 445.

The output of the both the OR gate 450 (leakDet_1) and the OR gate 455 (leakDet_2) inputs to an AND gate 460. The output of AND gate 460 inputs to an AND gate 480 that ANDs the carrier leakage detection signal together with a signal detection signal (!sigDet). The signal detection signal (!sigDet) goes high when the receiver has received a valid CCA signal. So when the carrier leakage signal is high and the valid CCA signal is high (!sigDet), the AND gate 480 outputs a leakage detection signal (leakDetEff). This output may then be used in conjunction with the FIG. 9 circuit or alternatively without the FIG. 9 circuit described below to avoid receiving transmission errors. Additionally, an OR gate may be substituted for the AND gate 460 for increased sensitivity.

Figure 9:
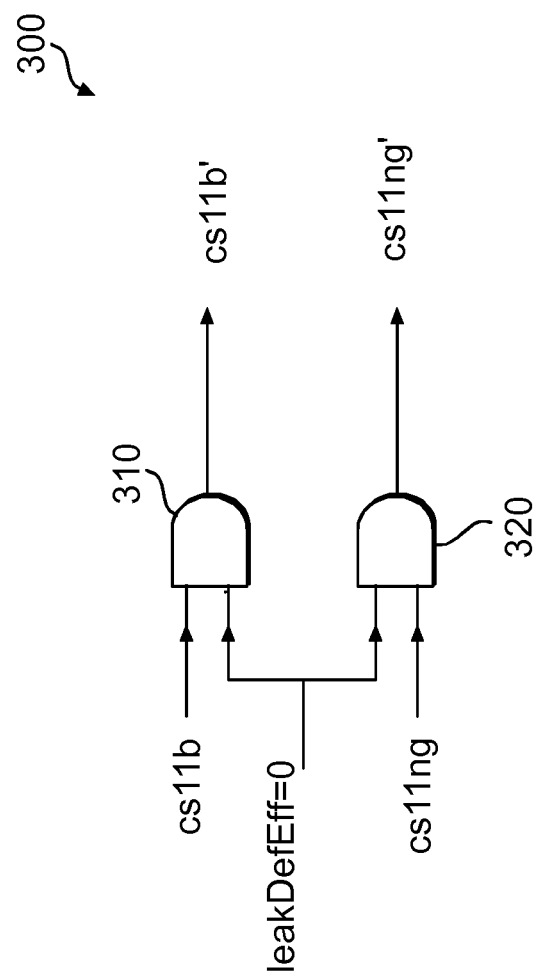
FIG. 9 shows a circuit that may be used with the carrier leakage detection circuits of the invention for operating with a plurality of transmission protocols.

FIG. 9 shows a circuit for use with any of the leakage detection signal circuits of the invention that is responsive to a protocol type signal to output a protocol signal when there is no carrier leakage or disable a protocol signal when there is carrier leakage. In particular, circuit 300 shown in FIG. 9 receives, from AND gate 280 or control 501 for example, the leakage detection signal (leakDetEff) in both an AND gate 310 and an AND gate 320. Also being input to the AND gate 310 is a cs11b signal, which is indicative of a CCA signal from the receiver indicating reception of a particular WLAN transmission protocol type, such as for example one that is compliant with IEEE 802.11, 802.11(a), 802.11(b), 802.11 (g), 802.11(n), 802.16, or 802.20. Similarly, the AND gate 320 receives the leakage detection signal together with a CCA signal, such as a cs11ng signal indicating reception of a different particular WLAN transmission protocol type, for example one that is compliant with IEEE 802.11, 802.11(a), 802.11(b), 802.11(g), 802.11(n), 802.16, or 802.20. Accordingly, an absence of an output from the AND gate 310 of a cs11b' signal disables the erroneous reception of the carrier leakage 110 for that transmission type; and the absence of an output from the AND gate 320 of a cs11ng' signal disables the erroneous reception of the carrier leakage 110 for that transmission type. Moreover, it is contemplated that the leakage detection signal also may reset the gain acquisition control circuitry, other similar circuitry, or system state in a transmitter to ensure transmission reception.

Figure 10:
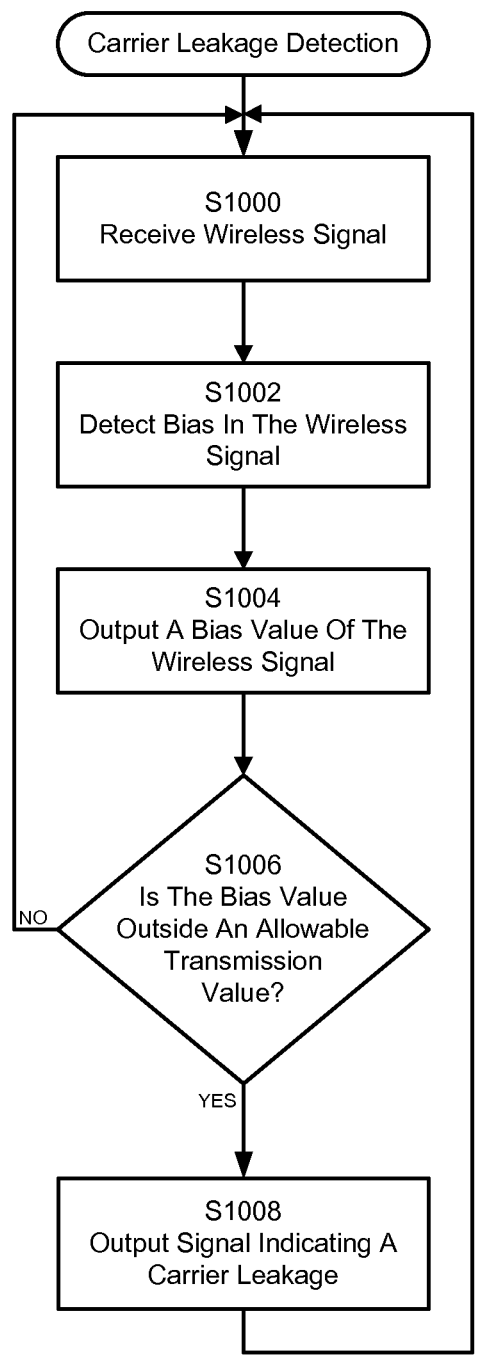
FIG. 10 shows a flow chart of a process for detecting carrier leakage that may be implemented in the circuits of the invention.

FIG. 10 shows an exemplary logic flow chart of a process for detecting carrier leakage according the principles of the invention, which may be implemented in the circuits of the invention. As shown in step S1000, a wireless signal, such as a WLAN transmission frame 100, is received in a receiver. Next in step S1002, bias in a characteristic of the received wireless signal such as logical state is detected in accordance with the principles of the invention discussed above. The bias value of the signal that is detected is output in step S1004.

As further shown in step S1006 of FIG. 10, it is determined whether or not the bias is outside allowable transmission values. In particular, when the bias is outside the allowable transmission values, then there is most likely some carrier leakage in the wireless signal. More specifically, the bias is outside the allowable transmission values when the bias has failed to meet a minimum threshold and/or exceeded a maximum threshold. When it is determined that the bias value is outside an allowable transmission value the logic will flow to step S1008 along the Yes branch of the flow chart of FIG. 10. In step S1008, a signal indicating carrier leakage is output. The signal indicating carrier leakage subsequently may be logically combined with other receiver signals to disable the receiver to avoid a reception error and reduced throughput caused by carrier leakage. On the other hand, should the bias value be inside an allowable transmission value, the logic will flow to the No branch. Accordingly, the process of detecting carrier leakage may be repeated for further received wireless signals.

It should be noted that although the counters are described in the above-noted embodiments as counting ones it is contemplated that the counters could also count zeros, changes in states or transitions, or any other logical states known in the art.

In accordance with various embodiments of the invention, the methods described herein are intended for operation with dedicated hardware implementations including, but not limited to, semiconductors, application specific integrated circuits, programmable logic arrays, and other hardware devices constructed to implement the methods and modules described herein. Moreover, various embodiments of the invention described herein are intended for operation as software programs running on a computer processor. Furthermore, alternative software implementations including, but not limited to, distributed processing, component/object distributed processing, parallel processing, virtual machine processing, any future enhancements, or any future protocol can also be used to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Figure 11:
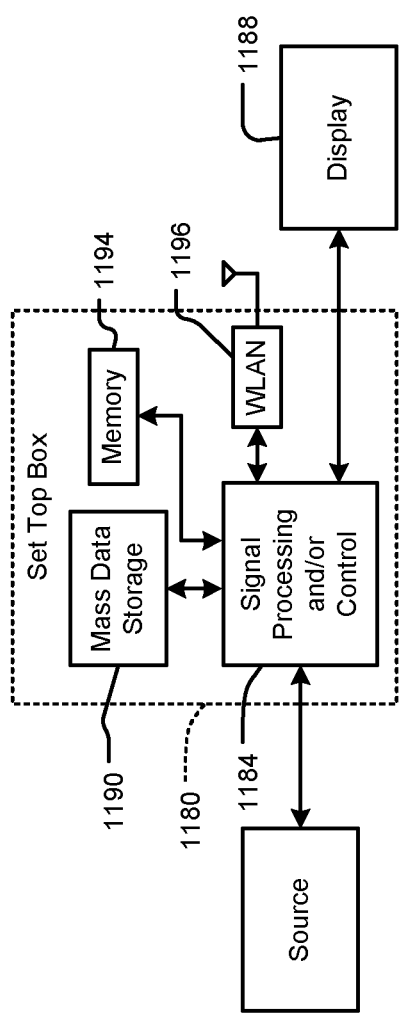
FIGS. 11, 12, 13, 14, and 15 show various exemplary implementations of the invention.

The invention can be implemented in a variety of devices, some of which are described in more detail below. Referring now to FIG. 11, the invention can be implemented in a set top box 1180. The invention may implement either or both signal processing and/or control circuits, which are generally identified in FIG. 11 at 1184, a WLAN interface and/or mass data storage of the set top box 1180. The set top box 1180 receives signals from a source such as a broadband source and outputs standard and/or high definition audio/video signals suitable for a display 1188 such as a television and/or monitor and/or other video and/or audio output devices. The signal processing and/or control circuits 1184 and/or other circuits (not shown) of the set top box 1180 may process data, perform coding and/or encryption, perform calculations, format data and/or perform any other set top box function.

The set top box 1180 may communicate with mass data storage 1190 that stores data in a nonvolatile manner. The mass data storage 1190 may include optical and/or magnetic storage devices for example hard disk drives HDD and/or DVDs. The HDD may be a mini HDD that includes one or more platters having a diameter that is smaller than approximately 1.8". The set top box 1180 may be connected to memory 1194 such as RAM, ROM, low latency nonvolatile memory such as flash memory and/or other suitable electronic data storage. The set top box 1180 also may support connections with a WLAN via a WLAN network interface 1196 constructed according the principles of the invention.

Figure 12:
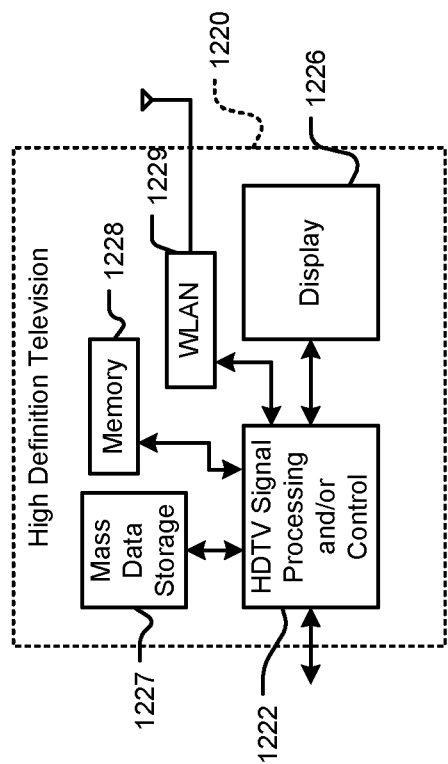

Referring now to FIG. 12, the invention can be implemented in a high definition television (HDTV) 1220. The invention may implement either or both signal processing and/or control circuits, which are generally identified in FIG. 12 at 1222, a WLAN interface and/or mass data storage of the HDTV 1220. The HDTV 1220 receives HDTV input signals in either a wired or wireless format and generates HDTV output signals for a display 1226. In some implementations, signal processing and/or control circuit 1222 and/or other circuits (not shown) of the HDTV 1220 may process data, perform coding and/or encryption, perform calculations, format data and/or perform any other type of HDTV processing that may be required.

The HDTV 1220 may communicate with mass data storage 1227 that stores data in a nonvolatile manner such as optical and/or magnetic storage devices. The HDD may be a mini HDD that includes one or more platters having a diameter that is smaller than approximately 1.8". The HDTV 1220 may be connected to memory 1228 such as RAM, ROM, low latency nonvolatile memory such as flash memory and/or other suitable electronic data storage. The HDTV 1220 also may support connections with a WLAN via a WLAN network interface 1229 constructed according the principles of the invention.

Figure 13:
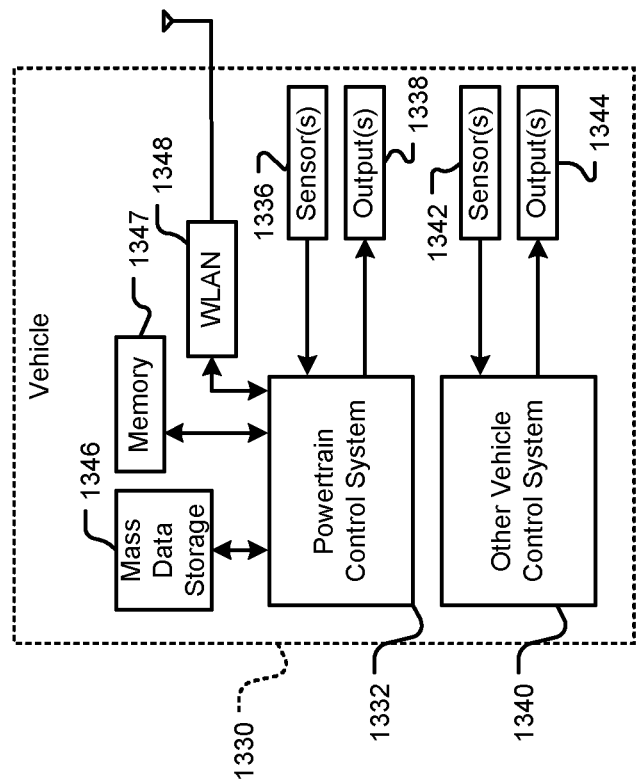

Referring now to FIG. 13, the invention can be implemented in a control system of a vehicle 1330, a WLAN interface and/or mass data storage of the vehicle control system. In some implementations, the invention can be implemented a powertrain control system 1332 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The invention may also be implemented in other control systems 1340 of the vehicle 1330. The control system 1340 may likewise receive signals from input sensors 1342 and/or output control signals to one or more output devices 1344. In some implementations, the control system 1340 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1332 may communicate with mass data storage 1346 that stores data in a nonvolatile manner. The mass data storage 1346 may include optical and/or magnetic storage devices for example hard disk drives HDD and/or DVDs. The HDD may be a mini HDD that includes one or more platters having a diameter that is smaller than approximately 1.8". The powertrain control system 1332 may be connected to memory 1347 such as RAM, ROM, low latency nonvolatile memory such as flash memory and/or other suitable electronic data storage. The powertrain control system 1332 also may support connections with a WLAN via a WLAN network interface 1348 constructed according the principles of the invention. The control system 1340 may also include mass data storage, memory and/or a WLAN interface (all not shown).

Figure 14:
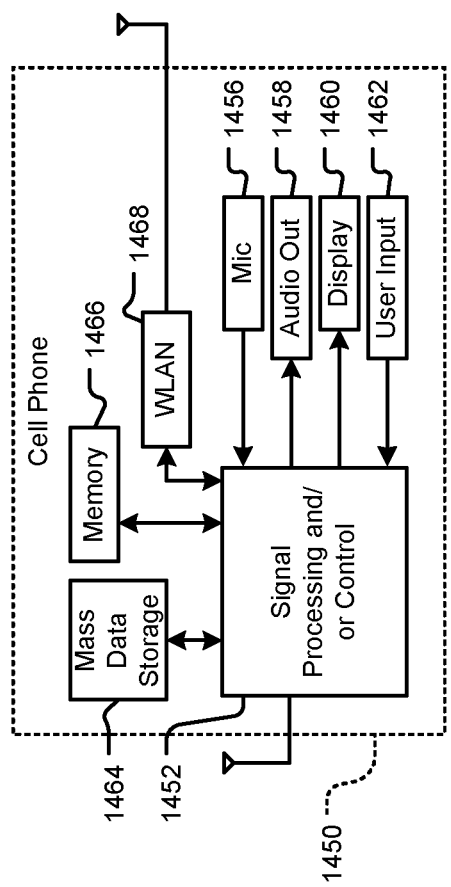

Referring now to FIG. 14, the invention can be implemented in a cellular phone 1450 that may include a cellular antenna 1451. The invention may implement either or both signal processing and/or control circuits, which are generally identified in FIG. 14 at 1452, a WLAN interface and/or mass data storage of the cellular phone 1450. In some implementations, the cellular phone 1450 includes a microphone 1456, an audio output 1458 such as a speaker and/or audio output jack, a display 1460 and/or an input device 1462 such as a keypad, pointing device, voice actuation and/or other input device. The signal processing and/or control circuits 1452 and/or other circuits (not shown) in the cellular phone 1450 may process data, perform coding and/or encryption, perform calculations, format data and/or perform other cellular phone functions.

The cellular phone 1450 may communicate with mass data storage 1464 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 1450 may be connected to memory 1466 such as RAM, ROM, low latency nonvolatile memory such as flash memory and/or other suitable electronic data storage. The cellular phone 1450 also may support connections with a WLAN via a WLAN network interface 1468 constructed according the principles of the invention.

Figure 15:
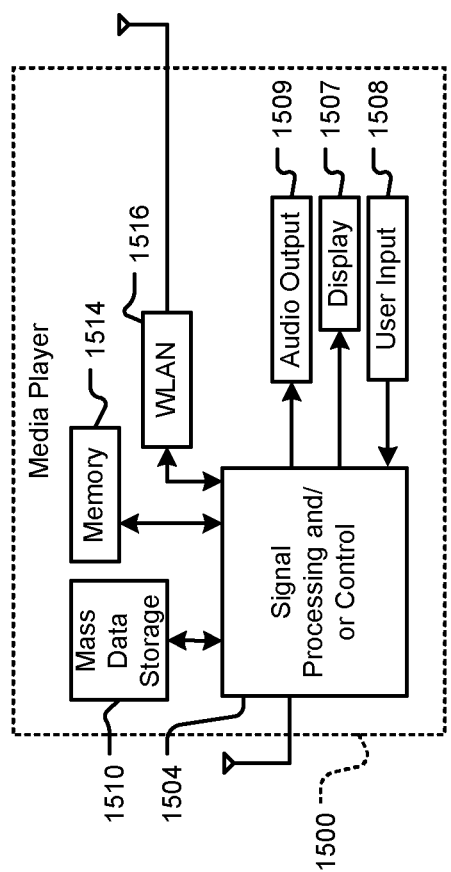

Referring now to FIG. 15, the invention can be implemented in a media player 1500. The invention may implement either or both signal processing and/or control circuits, which are generally identified in FIG. 15 at 1504, a WLAN interface and/or mass data storage of the media player 1500. In some implementations, the media player 1500 includes a display 1507 and/or a user input 1508 such as a keypad, touchpad and the like. In some implementations, the media player 1500 may employ a graphical user interface (GUI) that typically employs menus, drop down menus, icons and/or a point-and-click interface via the display 1507 and/or user input 1508. The media player 1500 further includes an audio output 1509 such as a speaker and/or audio output jack. The signal processing and/or control circuits 1504 and/or other circuits (not shown) of the media player 1500 may process data, perform coding and/or encryption, perform calculations, format data and/or perform any other media player function.

The media player 1500 may communicate with mass data storage 1510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 1500 may be connected to memory 1514 such as RAM, ROM, low latency nonvolatile memory such as flash memory and/or other suitable electronic data storage. The media player 1500 also may support connections with a WLAN via a WLAN network interface 1516 constructed according the principles of the invention. Still other implementations in addition to those described above are contemplated.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

What is claimed:

1. An apparatus, comprising:
   a measurement circuit configured to generate a measurement signal indicative of a bias in a signal received via a communication channel; and
   a circuit configured to generate, using the measurement signal, a detection signal that indicates presence of an unmodulated radio frequency (RF) carrier prior to a communication frame in the signal received via the communication channel.

2. An apparatus according to claim 1, further comprising a buffer to store logical states corresponding to the signal received via the communication channel,
   wherein the measurement circuit is configured to generate the measurement signal based on logical states stored in the buffer.

3. An apparatus according to claim 1, wherein the measurement circuit is configured to:
   count a number of transitions between logical states corresponding to the signal received via the communication channel; and
   generate the measurement signal based on the number of transitions.

4. An apparatus according to claim 1, wherein the measurement circuit is configured to:
   determine a time period of a particular logical state in the signal received via the communication channel; and
   generate the measurement signal based on the time period.

5. An apparatus according to claim 1, wherein:
   the measurement circuit includes a counter configured to count a number of values that correspond to a particular logical state in the signal received via the communication channel; and
   the measurement circuit is configured to generate the measurement signal based on the number of values that correspond to the particular logical state.

6. An apparatus according to claim 5, wherein:
   the circuit configured to generate the detection signal includes a comparator to compare the measurement signal to a threshold; and
   the circuit is configured to generate the detection signal based on an output of the comparator.

7. An apparatus according to claim 1, wherein:
   the measurement circuit includes i) a first counter configured to count a number of values that correspond to a particular logical state in an in-phase component of the signal received via the communication channel, and ii) a second counter configured to count a number of values that correspond to the particular logical state in a quadrature component of the signal received via the communication channel;
   the measurement signal is a first measurement signal;
   the measurement circuit is configured to
   i) generate the first measurement signal based on the number of values that correspond to the particular logical state in the in-phase component, and
   ii) generate a second measurement signal based on the number of values that correspond to the particular logical state in the quadrature component;
   the circuit configured to generate the detection signal includes i) a first comparator to compare the first measurement signal to a threshold, and ii) a second comparator to compare the second measurement signal to the threshold; and
   the circuit is configured to generate the detection signal based on i) an output of the first comparator, and ii) an output of the second comparator.

8. An apparatus according to claim 1, wherein:
   the measurement signal is a first measurement signal;
   the measurement circuit is configured to i) generate the first measurement signal based on an in-phase component of the signal received via the communication channel, and ii) generate a second measurement signal based on a quadrature component of the signal received via the communication channel; and
   the circuit configured to generate the detection signal is configured to generate the detection signal using the first measurement signal and the second measurement signal.

9. An apparatus according to claim 1, further comprising a further circuit configured to generate, using i) the detection signal and ii) a first protocol detection signal indicative of detection of a frame conforming to a first communication protocol, a frame detect signal indicative of detection of a communication frame.

10. An apparatus according to claim 9, wherein the further circuit is configured to generate the frame detect signal further using a second protocol detection signal indicative of detection of a frame conforming to a second communication protocol.

11. An apparatus of claim 1, wherein the measurement signal indicative of the bias is indicative of a particular bias in favor of one of a plurality of possible logical states.

12. A method, comprising:
    generating a measurement signal indicative of a bias in a signal received via a communication channel; and
    generating, using the measurement signal, a detection signal that indicates presence of an unmodulated radio frequency (RF) carrier prior to a communication frame in the signal received via the communication channel.

13. A method according to claim 12, further comprising storing, in a buffer, logical states corresponding to the signal received via the communication channel,
    wherein generating the measurement signal is based on logical states stored in the buffer.

14. A method according to claim 12, wherein generating the measurement signal comprises:
    counting a number of transitions between logical states corresponding to the signal received via the communication channel; and
    generating the measurement signal based on the number of transitions.

15. A method according to claim 12, wherein generating the measurement signal comprises:
    determining a time period of a particular logical state in the signal received via the communication channel; and
    generating the measurement signal based on the time period.

16. A method according to claim 12, wherein generating the measurement signal comprises:
    counting a number of values that correspond to a particular logical state in the signal received via the communication channel; and generating the measurement signal based on the number of values that correspond to the particular logical state.

17. A method according to claim 16, wherein generating the detection signal comprises:
comparing the measurement signal to a threshold; and
generating the detection signal based on whether the measurement signal meets the threshold.

18. A method according to claim 12, wherein:
the measurement signal is a first measurement signal;
wherein generating the first measurement signal comprises
counting a number of values that correspond to a particular logical state in an in-phase component of the signal received via the communication channel, and
generating the first measurement signal based on the number of values that correspond to the particular logical state in the in-phase component;
wherein the method further comprises
counting a number of values that correspond to the particular logical state in a quadrature component of the signal received via the communication channel, and
generating a second measurement signal based on the number of values that correspond to the particular logical state in the quadrature component; and
wherein generating the detection signal comprises
comparing the first measurement signal to a threshold,
comparing the second measurement signal to the threshold, and
generating the detection signal based on i) whether the first measurement signal meets the threshold, and ii) whether the second measurement signal meets the threshold.

19. A method according to claim 12, wherein:
the measurement signal is a first measurement signal;
generating the first measurement signal comprises generating the first measurement signal based on an in-phase component of the signal received via the communication channel;
the method further comprises generating a second measurement signal based on a quadrature component of the signal received via the communication channel, wherein generating the detection signal comprises using the first measurement signal and the second measurement signal.

20. A method according to claim 12, further comprising generating, using i) the detection signal and ii) a first protocol detection signal indicative of detection of a frame conforming to a first communication protocol, a frame detect signal indicative of detection of a communication frame.

21. A method according to claim 20, wherein generating the frame detect signal further comprises using a second protocol detection signal indicative of detection of a frame conforming to a second communication protocol.

22. A method according to claim 12, further comprising disabling a receiver when the detection signal indicates presence of the unmodulated RF carrier prior to a communication frame in the signal received via the communication channel.

23. A method according to claim 12, further comprising resetting a gain control circuit when the detection signal indicates presence of the unmodulated RF carrier prior to a communication frame in the signal received via the communication channel.

24. A method according to claim 12, further comprising resetting a system state in a transmitter when the detection signal indicates presence of the unmodulated RF carrier prior to a communication frame in the signal received via the communication channel.

25. A method according to claim 12, wherein generating the measurement signal comprises determining whether the received signal has a particular bias in favor of one of a plurality of possible logical states.

* * * * *